(12) United States Patent
Onomatsu

(10) Patent No.: US 7,215,385 B2
(45) Date of Patent: May 8, 2007

(54) BROADCAST RECEIVER

(75) Inventor: Takehiro Onomatsu, Osaka (JP)

(73) Assignee: Funai Electric Co., Ltd., Daito-shi (JP)

( * ) Notice: Subject to any disclaimer, the term of this patent is extended or adjusted under 35 U.S.C. 154(b) by 493 days.

(21) Appl. No.: 10/793,664

(22) Filed: Mar. 4, 2004

(65) Prior Publication Data

US 2004/0218103 A1 Nov. 4, 2004

(30) Foreign Application Priority Data

Mar. 4, 2003 (JP) ............................ P2003-056744

(51) Int. Cl.
*H04N 5/50* (2006.01)
*H04N 5/44* (2006.01)

(52) U.S. Cl. ...................... 348/731; 348/725

(58) Field of Classification Search ........ 348/731–733, 348/725, 734, 553, 554; 455/132, 133, 178.1, 455/191.1; H04N 5/50, 5/44
See application file for complete search history.

(56) References Cited

U.S. PATENT DOCUMENTS

| | | | | |
|---|---|---|---|---|
| 5,933,192 A | * | 8/1999 | Crosby et al. | 348/731 |
| 6,519,011 B1 | * | 2/2003 | Shendar | 348/731 |
| 6,714,264 B1 | * | 3/2004 | Kempisty | 348/732 |

FOREIGN PATENT DOCUMENTS

| | | |
|---|---|---|
| JP | 11-27102 | 1/1999 |
| JP | 2001-24537 | 1/2001 |
| JP | 2001-94892 | 4/2001 |

OTHER PUBLICATIONS

Concise Statement of Relevancy Between The Invention and Materials (1 page).
Japanese Office Action for Japanese patent application No.: 2003-056744, issued February 24, 2006, and English translation thereof, 5 pages.

* cited by examiner

*Primary Examiner*—Sherrie Hsia
(74) *Attorney, Agent, or Firm*—Osha Liang LLP

(57) ABSTRACT

In a broadcast receiver, where the user operates a channel up/down key of a remote controller, when the broadcast signal to be next received is an analog broadcast signal, a tuner unit which has received a broadcast signal immediately before the operation receives the analog broadcast signal to be next received. In the broadcast receiver, in accordance with the side of the channel up/down key which is operated by the user (the up side or the down side), a digital broadcast signal of a channel number which is closest to the channel that is currently received and output by one of tuner units is previously received by the other tuner unit. When the user selects the channel of the digital broadcast signal which is received by the other tuner unit, the broadcast receiver outputs video and audio signals on the basis of the digital broadcast signal which is already received.

5 Claims, 3 Drawing Sheets

BROADCAST RECEIVER

BACKGROUND OF THE INVENTION

1. Field of the Invention

The present invention relates to a broadcast receiver that can selectively receive a digital broadcast and an analog broadcast.

2. Description of the Related Art

Cable television is in widespread use in North America. The user can select a desired one of plural channels to watch a program of the selected channel. In North America, in addition to an analog broadcast which is conventionally used, a digital broadcast which is typified by a BS (Broadcasting Satellite) digital broadcast or a CS (Communication Satellite) digital broadcast is becoming pervasive. In such a digital broadcast, as compared with an analog broadcast, the image quality can be improved higher and the number of channels can be increased. In North America, furthermore, a digital broadcast (terrestrial digital broadcast) which is standardized by ATSC (Advanced Television Systems Committee) has been started. In a digital broadcast, a broadcast signal is transmitted with using a physical channel which is different from that of an analog broadcast, and bands between channels of an analog broadcast are allocated to channels of the digital broadcast. Namely, channels of a digital broadcast exist mixedly with those of an analog broadcast. In the case of channel Nos. 1 to 10, for example, channel allocation is conducted so that channels. 1, 3, 4, 5, 8, and 10 are channels of an analog broadcast, and channels. 2, 6, 7, and 9 are those of a digital broadcast.

In an analog television broadcast, a broadcast station transmits an uncompressed television broadcast signal of one channel on one signal of one physical channel (one frequency band). When it is detected that the user conducts an operation of selecting a channel of the analog broadcast, a broadcast receiver first receives a broadcast signal of the frequency band corresponding to the selected channel, and then immediately outputs video and audio signals to a display apparatus. Therefore, substantially no time period elapses from the timing when the operation of selecting the channel is conducted on the broadcast receiver, to that when an analog broadcast signal of the channel is reproduced on the display apparatus, so that the user can immediately view a program of the channel.

By contrast, in a digital television broadcast, a broadcast station applies compression coding on signals of plural channels by using a digital compression technique, and then transmits the signals in one physical channel (one frequency band) in a time-division manner. Specifically, a digital-television broadcast station multiplexes signals into a signal of one frequency band, and then transmits television broadcast signals of plural channels which are called subchannels. The digital-television broadcast station further transmits a signal containing channel information required for restoring a signal of a desired channel, every two or three seconds with adding the signal to the compressed and multiplexed digital broadcast signal.

When it is detected that the user conducts an operation of selecting a channel, a broadcast receiver first receives a digital broadcast signal of the frequency band corresponding to the selected channel, and then extracts the channel information signal contained in the received signal. On the basis of the channel information signal, the broadcast receiver then separates and extracts a signal of the selected channel from the received digital broadcast signal, restores the signal to the original or uncompressed state, and outputs the restored signal to a display apparatus. After the user conducts an operation of selecting a channel on the broadcast receiver, therefore, the user must wait for about five to ten seconds before a broadcast signal of the channel is reproduced on the display apparatus. During this time period, the user must view the screen of the broadcast receiver on which no image is displayed or no signal is reproduced. In the broadcast receiver, where a digital broadcast signal of one physical channel is received and video and audio signals of a certain subchannel are once output to a monitor apparatus, when an operation of changing a channel is conducted so as to output another subchannel of the physical channel to the monitor apparatus, video and audio signals of the subchannel are immediately output to the monitor apparatus.

Conventionally, a broadcast receiver has bee proposed in which the time period required for channel tuning in a situation where a digital broadcast and an analog broadcast mixedly exist can be shortened (for example, see JP-A-2001-24537 (pages 2 and 3, FIGS. 1 and 2)).

In the broadcast receiver disclosed in JP-A-2001-24537, in order to select a desired one of plural channels to view a program, the user can conduct channel selection on the broadcast receiver by using an inputting device such as a remote controller. Specifically, the user operates a numeric keypad of the remote controller to input a channel number, so that the channel to be viewed can be quickly selected. Alternatively, the user may operate a channel up/down key to sequentially switch over channels while displaying programs on a display apparatus to check the programs, so that a favorite program can be selected.

SUMMARY OF THE INVENTION

The broadcast receiver disclosed in JP-A-2001-24537 includes a digital tuner and an NTSC tuner (analog tuner), and, while conducting a tuning search for a channel of a digital broadcast, can search a channel of an analog broadcast. Therefore, the broadcast receiver can shorten the waiting time period which must elapse before a broadcast is received.

However, the broadcast receiver has the following problem. In the case where the user is viewing a digital broadcast, even when an operation of receiving another digital broadcast is conducted, it is impossible to immediately receive the other digital broadcast, and hence the waiting time period which must elapse before a broadcast is received cannot be shortened.

It is an object of the invention to provide a broadcast receiver which, when a channel is switched over, can immediately output a selected broadcast signal irrespective of the kind of the selected broadcast signal.

In order to solve the problem, the invention is configured in the following manner.

A broadcast receiver including: a plurality of receiving means each of which receives an analog broadcast signal and a digital broadcast signal; a channel up/down means through which a channel is selected in ascending or descending order of channel number; a reception controlling means which, when a digital broadcast signal or an analog broadcast signal of a physical channel selected by the channel up/down means is received by any one of the receiving means, causes another one of the receiving means to receive a digital broadcast signal of a physical channel allocated to a next rank to be selected by a channel-up or channel-down operation with respect to a currently selected physical channel; and a switching means which selects one of the receiving means to output a broadcast signal from the selected receiving section.

Digital broadcast signals are transmitted in the form that broadcast signals of plural channels called subchannels are compressed with being multiplexed to one frequency band, and a signal containing channel information required for restoring signals of the channels are added every two or three seconds to the compressed and multiplexed digital broadcast signal. In a conventional broadcast receiver, after the user conducts an operation of selecting a channel, therefore, the user must wait for about five to ten seconds before a program of the channel is reproduced on a display apparatus. During this period, the user must view the screen of the broadcast receiver on which no image is displayed or no signal is reproduced. By contrast, according to the configuration, the broadcast receiver can previously receive a digital broadcast. When the user selects a channel in ascending or descending order of channel number, therefore, a program of the digital broadcast can be promptly displayed on a monitor apparatus, so that the user can check the program with requiring substantially no waiting time period.

Furthermore, the broadcast receiver is characterized in that the receiving section which receives a digital broadcast signal or an analog broadcast signal of the physical channel selected by the channel up/down section is controlled to, in a case where the switching section selects the receiving section to output the broadcast signal and an input of selecting a next channel is conducted through the channel up/down section, when the next channel is an analog broadcast or a digital broadcast of the same physical channel, continue to receive the next channel.

When an analog or digital broadcast signal of a frequency band corresponding to an analog broadcast of another channel or a channel of a digital broadcast of the same physical channel is to be received, video and audio signals can be output immediately or with requiring substantially no waiting time period. Therefore, the user can check a program on a display apparatus with requiring substantially no waiting time period.

The reception controlling section is characterized in that, when a digital broadcast signal or an analog broadcast signal of the physical channel selected by the channel up/down section is received by any one of the receiving sections, the reception controlling section causes another one of the receiving sections to receive a digital broadcast signal of a physical channel which is next in an order selected by a channel-up or channel-down operation, with respect to the currently selected physical channel.

According to the configuration, when the user operates the channel up/down section to switch over a channel, the user can view a channel of the digital broadcast which is to be next received, with requiring substantially no waiting time period. Moreover, even when a channel which is received just before the operation is to be again viewed, the user can view the channel with requiring substantially no waiting time period.

DETAILED DESCRIPTION OF THE PREFERRED EMBODIMENTS

Figure 1:
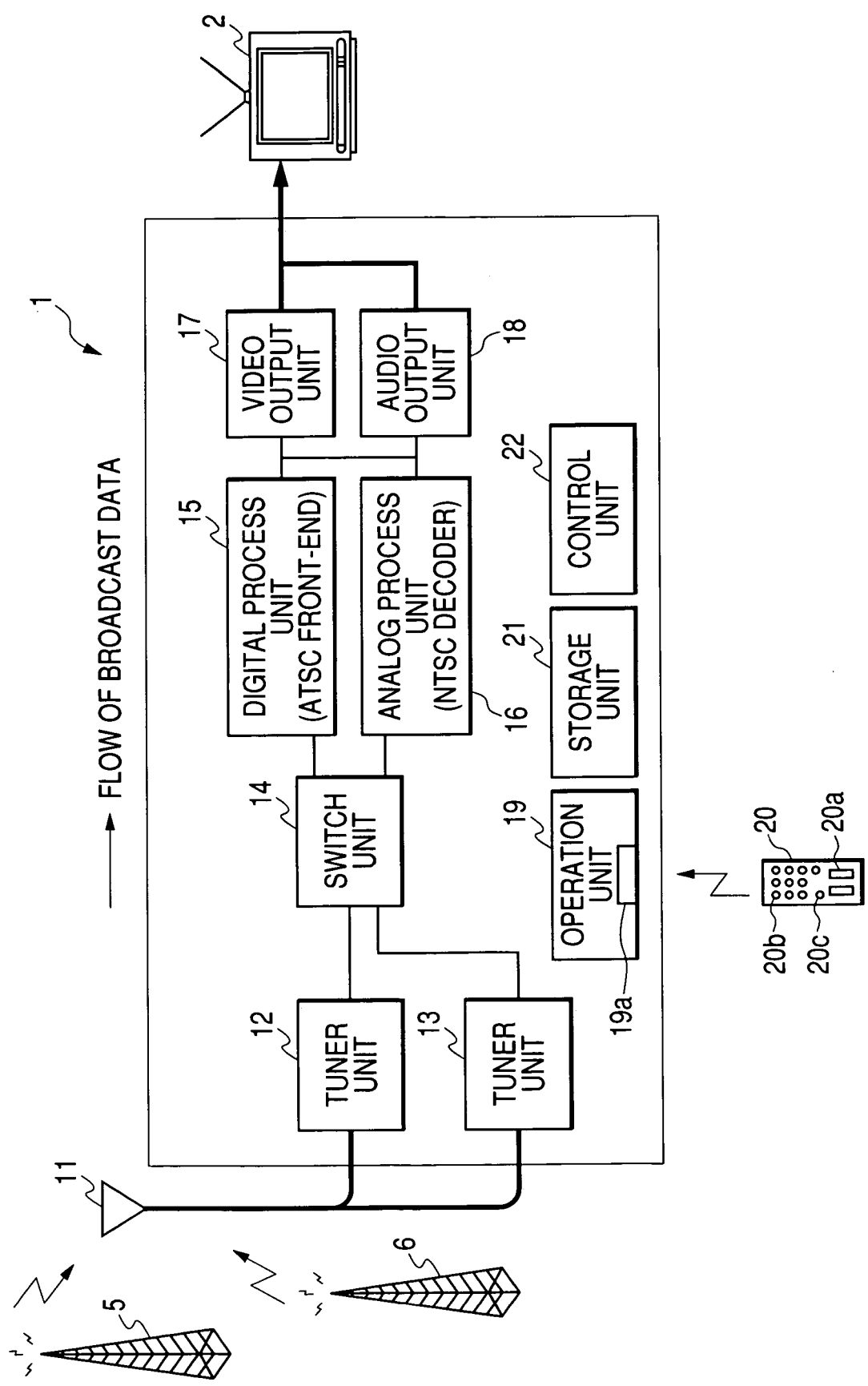
FIG. 1 is a block diagram specifically showing the configuration of a broadcast receiver of an embodiment of the invention.

FIG. 1 is a block diagram specifically showing the configuration of a broadcast receiver of an embodiment of the invention. A broadcast receiver 1 receives via an antenna 11 radio waves which are radiated from a radio tower 5 of a broadcast station and a radio tower 6 of another broadcast station, and processes broadcast signals to output video and audio signals to a monitor apparatus 2 which is a displaying section. The broadcast receiver 1 can receive both a terrestrial digital broadcast (ATSC system) and a conventional terrestrial analog broadcast (NTSC system).

The broadcast receiver 1 includes the antenna 11, a tuner unit 12, a tuner unit 13, a switch unit 14, a digital process unit (ATSC front-end) 15, an analog process unit (NTSC decoder) 16, a video output unit 17, an audio output unit 18, an operation unit 19, a remote controller 20, a storage unit 21, and a control unit 22.

Broadcast data of programs which are output from plural broadcast stations such as analog and digital broadcast stations (not shown) are radiated as radio waves (broadcast signals) of different frequencies from the radio towers 5 and 6. The tuner units 12, 13 receive analog and digital broadcast signals radiated from the radio towers 5 and 6, and outputs the broadcast signals to the switch unit 14. When the user operates the operation unit 19 or the remote controller 20 to select a channel, the tuner unit 12 and the tuner unit 13 receive the broadcast signal of the selected channel in accordance with the situation. In the case where the user operates a channel up/down key 20a of the remote controller 20, while one of the tuner units receives an analog or digital broadcast signal and outputs the broadcast signal via the switch unit 14, the other tuner unit previously receives a digital broadcast signal which is scheduled to be next received, in accordance with the operation on the channel up/down key 20a. A specific procedure of receiving a broadcast signal will be described later.

When the user operates the operation unit 19 or the remote controller 20 to select a channel to be received, the switch unit 14 outputs the broadcast signal received by the one of the tuner units 12 and 13, to the digital process unit 15 or the analog process unit 16 in accordance with the selection operation. Specifically, in the case where the tuner unit 12 or the tuner unit 13 receives a digital broadcast signal (for example, a broadcast signal of the ATSC system), the switch unit outputs the broadcast signal to the digital process unit 15. In the case where the tuner unit 12 or the tuner unit 13 receives an analog broadcast signal (for example, a broadcast signal of the NTSC system), the switch unit outputs the broadcast signal to the analog process unit 16.

The digital process unit 15 decodes the digital broadcast signal, and outputs the decoded signal to the video output unit 17 and the audio output unit 18. The analog process unit 16 decodes the analog broadcast signal, and outputs the decoded signal to the video output unit 17 and the audio output unit 18.

The video output unit 17 converts the video signal output from the digital process unit 15 or the analog process unit 16 to an analog signal which can be reproduced by the monitor apparatus 2, and outputs the analog signal to the monitor apparatus 2. The audio output unit 18 converts the audio signal output from the digital process unit 15 or the analog process unit 16 to an analog signal which can be reproduced by the monitor apparatus 2, and outputs the analog signal to the monitor apparatus 2.

The operation unit 19 is used for selecting a channel to be received by the broadcast receiver 1, and conducting various setting operations on the broadcast receiver 1. The operation unit 19 includes: a signal reception unit 19a which receives a signal output from the remote controller 20; and a channel up/down key (not shown) which can continuously switch over the cannel to be received by the broadcast receiver 1.

The remote controller 20 is used for, at a position separate from the broadcast receiver 1, selecting a channel to be received by the broadcast receiver 1, and conducting various setting operations on the broadcast receiver 1. The remote controller 20 includes the channel up/down key 20a which can continuously switch over the cannel to be received by the broadcast receiver 1.

The storage unit 21 stores data such as process programs to be executed by the control unit 22, and a channel map in which channels that can be received by the tuner units 12, 13 are registered. As well known in the art, the channel map is obtained by previously detecting channels in which programs are broadcasted for all receivable frequency bands, and registering the detected channels. When it is detected that the user operates the up side or the down side of the channel up/down key 20a of the remote controller 20 at a predetermined interval, the broadcast receiver 1 receives broadcast signals in ascending or descending order of number of channels registered in the channel map. The control unit 22 controls operations of various portions of the broadcast receiver 1.

Next, the operation of the broadcast receiver 1 in the case where the user operates the channel up/down key 20a of the remote controller 20 so as to continuously change the channel to be received will be described. In the broadcast receiver 1, when the user operates the channel up/down key 20a at the predetermined interval to continuously select or change the channel to be received, the control unit 22 controls one of the tuner unit 12 and the tuner unit 13 to receive a broadcast signal of the selected channel, and the other tuner unit to receive a broadcast signal of the channel to be next received.

In the broadcast receiver 1, in the case where the user operates the channel up/down key 20a of the remote controller 20, when the broadcast signal to be next received is an analog broadcast signal, a tuner unit which has received a broadcast signal immediately before the operation receives the analog broadcast signal to be next received. In the broadcast receiver 1, in the case where the user operates the channel up/down key 20a of the remote controller 20, a digital broadcast signal of a channel number which is closest to the channel that is currently received and output by one of the tuner units is previously received by the other tuner unit in accordance with the side of the channel up/down key 20a which is operated by the user (the up side or the down side). When the user further operates the channel up/down key 20a of the remote controller 20 to select the channel of the digital broadcast signal which is received by the other tuner unit, the broadcast receiver 1 outputs video and audio signals on the basis of the digital broadcast signal which is already received.

As described above, in the broadcast receiver 1, when an analog broadcast signal is received, the tuner units 12, 13 can immediately output video and audio signals to the monitor apparatus 2. By contrast, when a digital broadcast signal is received, video and audio signals cannot be immediately output. Therefore, a digital broadcast signal is previously received by the other tuner unit, and, when the channel of the digital broadcast signal is selected, video and audio signals are output on the basis of the digital broadcast signal which is already received. According to the configuration, even when the user continuously switches over the channel to be received and selects a channel of a digital broadcast, the user can view and listen to the image and sound output from the monitor apparatus 2 with requiring substantially no waiting time period.

Figure 2:
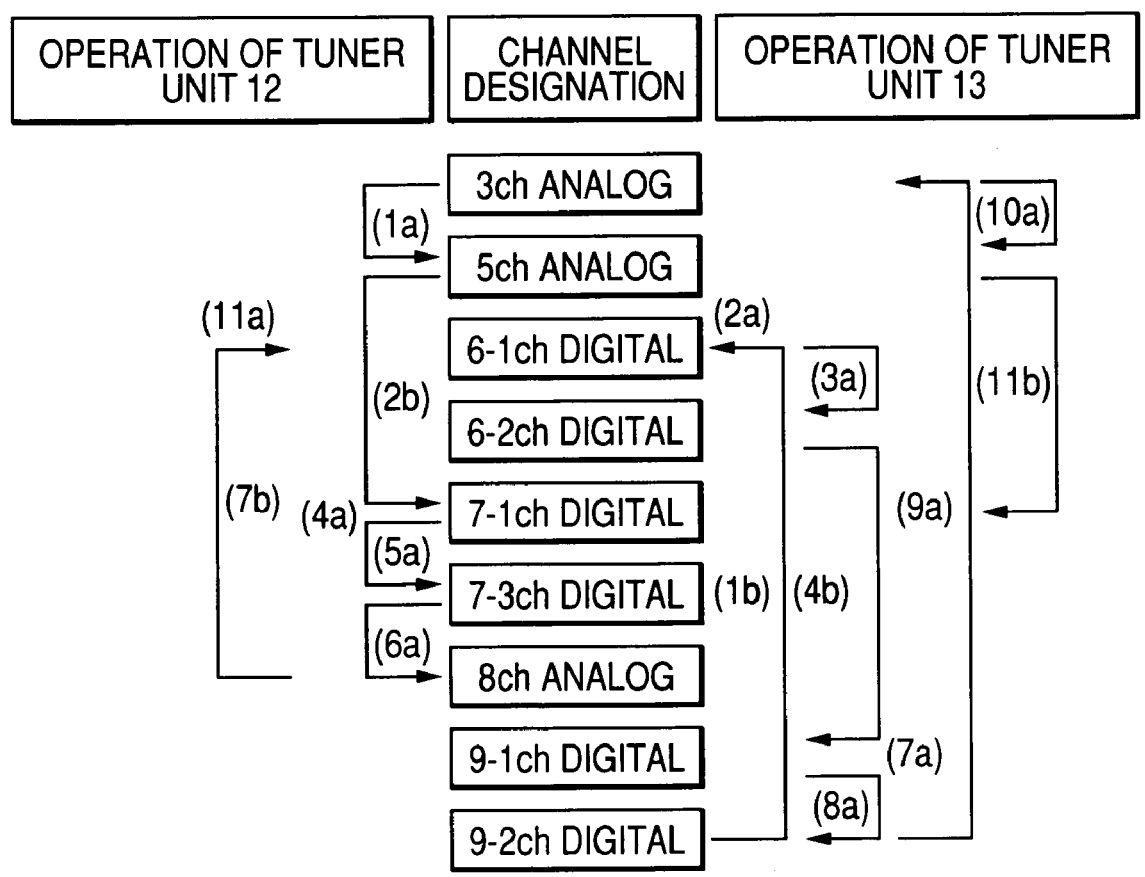
FIG. 2 is a diagram showing the order in which the broadcast receiver receives broadcast signals.

Specifically, a broadcast signal is received in the following procedure. FIG. 2 is a diagram showing the order in which the broadcast receiver receives broadcast signals. In the following description, it is assumed that reception is conducted while sequentially switching over channels 3 to 9 which are physical channels, channels 3, 5, and 8 are analog broadcast channels, channels 6, 7, and 9 are digital broadcast channels, channel 6 has subchannels 6-1, 6-2, channel 7 has subchannels 7-1, 7-3, and channel 9 has subchannels 9-1, 9-2. Channel 4 is an idle channel. In the channel map stored in the storage unit 21 of the broadcast receiver 1, recorded are data showing that, when the up button of the channel up/down key 20a is operated, signals of channels are received in the order of 3→5→6-1→6-2→7-1→7-3→8→9-1→9-2→3→5→. . . In the channel map, also information indicating whether the channels are an analog broadcast or a digital broadcast is recorded. With reference to the channel map, the control unit 22 controls the tuner units 12, 13 and the switch unit 14. In the following, the description of the operation in which the control unit 22 refers the channel map will be omitted.

In the broadcast receiver 1, for example, the tuner unit 12 receives an analog broadcast of channel 3, and outputs a signal via the switch unit 14. In the case where, in the most recently operation by the user, the down button of the channel up/down key 20a is operated, the tuner unit 13 receives channel 9-2.

(1) When the user operates the up button of the channel up/down key 20a of the remote controller 20, the reception channel of the broadcast receiver 1 is switched to channel 5. At this time, the control unit 22 controls the tuner unit 12 so as to receive the analog broadcast signal of channel 5, and output the analog broadcast signal to the analog process unit 16 via the switch unit 14 (1a). Furthermore, the control unit 22 controls the tuner unit 13 so as to receive the digital broadcast signal of a subchannel of channel 6 which is the channel of a digital broadcast that is closest to channel 5, i.e., channel 6-1 (1b).

(2) When the user again operates the up button of the channel up/down key 20a of the remote controller 20, the reception channel of the broadcast receiver 1 is switched to channel 6-1. At this time, the control unit 22 controls the switch unit 14 so as to output the digital broadcast signal of channel 6-1 which is already received by the tuner unit 13, to the digital process unit 15 (2a). Furthermore, the control unit 22 controls the tuner unit 12 so as to receive the digital broadcast signal of channel 7-1 which is a physical channel of a digital broadcast that is closest to channel 6 (2b).

(3) When the user again operates the up button of the channel up/down key 20a of the remote controller 20, the reception channel of the broadcast receiver 1 is switched to channel 6-2. At this time, the control unit 22 controls the tuner unit 13 so as to receive the digital broadcast signal of channel 6-2, and output the broadcast signal to the digital process unit 15 without switching over the switch unit 14 (3a).

(4) When the user again operates the up button of the channel up/down key 20a of the remote controller 20, the reception channel of the broadcast receiver 1 is switched to channel 7-1. At this time, the control unit 22 controls the switch unit 14 so as to output the digital broadcast signal of channel 7-1 which is already received by the tuner unit 12, to the digital process unit 15 (4a). Furthermore, the control unit 22 controls the tuner unit 13 so as to receive the digital broadcast signal of a subchannel of channel 9 which is the physical channel of a digital broadcast that is closest to channel 7 (4b), i.e., channel 9-1.

(5) When the user again operates the up button of the channel up/down key 20a of the remote controller 20, the reception channel of the broadcast receiver 1 is switched to channel 7-3. At this time, the control unit 22 controls the tuner unit 12 so as to receive the digital broadcast signal of channel 7-3, and output the broadcast signal to the digital process unit 15 without switching over the switch unit 14 (5a).

(6) When the user again operates the up button of the channel up/down key 20a of the remote controller 20, the reception channel of the broadcast receiver 1 is switched to channel 8. At this time, the control unit 22 controls the tuner unit 12 so as to receive the analog broadcast signal of channel 8, and switches over the switch unit 14 to output the broadcast signal to the analog process unit 16 (6a).

(7) When the user again operates the up button of the channel up/down key 20a of the remote controller 20, the reception channel of the broadcast receiver 1 is switched to channel 9-1. At this time, the control unit 22 controls the switch unit 14 so as to output the digital broadcast signal of channel 9-1 which is already received by the tuner unit 13, to the digital process unit 15 (7a). Furthermore, the control unit 22 controls the tuner unit 12 so as to receive the digital broadcast signal of the subchannel of channel 6 which is the channel of a digital broadcast that is closest to channel 9, i.e., channel 6-1 (7b).

(8) When the user again operates the up button of the channel up/down key 20a of the remote controller 20, the reception channel of the broadcast receiver 1 is switched to channel 9-2. At this time, the control unit 22 controls the tuner unit 13 so as to receive the digital broadcast signal of channel 9-2, and output the broadcast signal to the digital process unit 15 without switching over the switch unit 14 (8a).

(9) When the user again operates the up button of the channel up/down key 20a of the remote controller 20, the reception channel of the broadcast receiver 1 is switched to channel 3. At this time, the control unit 22 controls the tuner unit 13 so as to receive the analog broadcast signal of channel 3, and switches over the switch unit 14 to output the broadcast signal to the analog process unit 16 (9a).

(10) When the user again operates the up button of the channel up/down key 20a of the remote controller 20, the reception channel of the broadcast receiver 1 is switched to channel 5. At this time, the control unit 22 controls the tuner unit 13 so as to receive the analog broadcast signal of channel 5, and output the broadcast signal to the analog process unit 16 without switching over the switch unit 14 (10a).

(11) When the user again operates the up button of the channel up/down key 20a of the remote controller 20, the reception channel of the broadcast receiver 1 is switched to channel 6-1. At this time, the control unit 22 controls the switch unit 14 so as to output the digital broadcast signal of channel 6-1 which is already received by the tuner unit 12, to the digital process unit 15 (11a). Furthermore, the control unit 22 controls the tuner unit 13 so as to receive the digital broadcast signal of the subchannel of channel 7 which is the channel of a digital broadcast that is closest to channel 6, i.e., channel 7-1 (11b).

As described above, in the broadcast receiver 1, while being controlled so as to previously receive digital broadcast signals, the tuner units are alternately controlled so as to switch the broadcast signal to be received. When a digital broadcast is to be received, therefore, the user can view a program of the digital broadcast with requiring substantially no waiting time period.

The broadcast receiver 1 is set so that, when the down button of the channel up/down key 20a is operated, signals of channels are received in the order of 3→9-2→9-1→8→7→3→7-1→6-2→6-1→5→3→9-2→. . . The control unit 22 controls the tuner unit 12, the tuner unit 13, the switch unit 14, and other components so as to sequentially receive the broadcast signals of the channels in this order.

In the broadcast receiver 1, in the case where the user operates a numeric keypad of the remote controller 20 to select a specific one of the channels during a period when the user views a program of a certain channel, one of the tuner units continues to receive the broadcast signal of the certain channel, and the other tuner unit receives the broadcast signal of the specific channel which is designated by the user. In the broadcast receiver 1, in order to view a program of the specific channel and then that of the channel which is immediately before viewed, an Alt key (a key for displaying a channel which is immediately before viewed) of the remote controller is operated. When it is detected that the Alt key is operated, the broadcast signal of the channel which is received by the one tuner unit is output.

Figure 3:
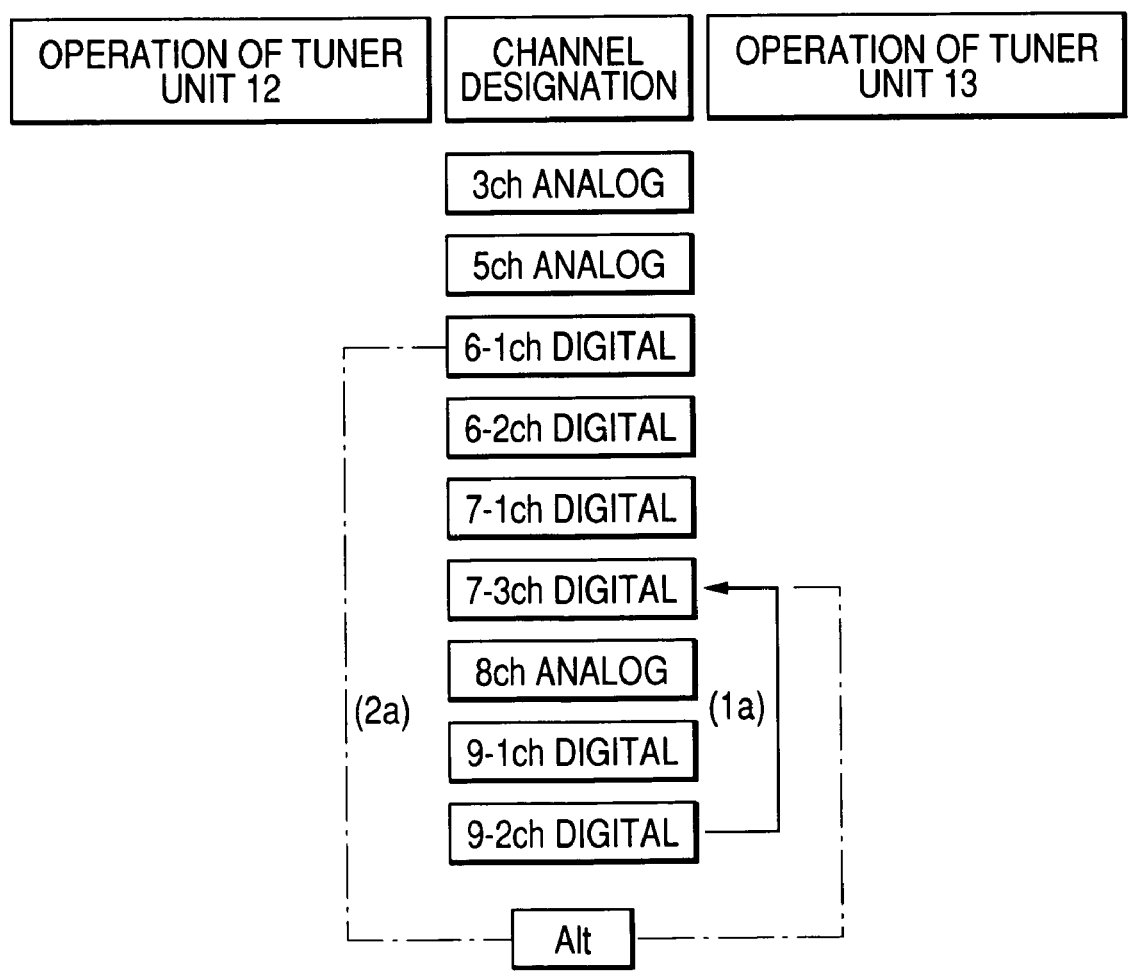
FIG. 3 is a diagram showing a modified order in which the broadcast receiver receives broadcast signals.

Specifically, a broadcast signal is received in the following procedure. FIG. 3 is a diagram showing the order in which the broadcast receiver receives broadcast signals.

In the broadcast receiver 1, from example, the tuner unit 12 receives the digital broadcast signal of channel 6-1, and the received signal is output via the switch unit 14. In the case where the user has operated the down button of the channel up/down key 20a immediately before this timing, the tuner unit 13 receives channel 9-2.

(1) When the user operates the numeric keypad 20b of the remote controller 20 so as to receive channel 7-3, the reception channel of the broadcast receiver 1 is switched to channel 7-3. At this time, the control unit 22 controls the tuner unit 13 so as to receive the digital broadcast signal of channel 7-3, and outputs the digital broadcast signal to the digital process unit 15 via the switch unit 14 (1a). The control unit 22 controls the tuner unit 12 so as to continue the reception of the digital broadcast signal of channel 6-1. At this time, a waiting time period for about five to ten seconds elapses before a program of channel 7-3 is displayed.

(2) When the user operates the Alt key 20c of the remote controller 20 in order to receive channel 6-1 which has been viewed at the initial timing, the reception channel of the broadcast receiver 1 is switched to channel 6-1 (2a). At this time, the control unit 22 controls the tuner unit 12 so as to continue the reception of the digital broadcast signal of channel 6-1, and outputs the digital broadcast signal to the digital process unit 15 via the switch unit 14. Furthermore, the control unit 22 controls the tuner unit 13 so as to continue the reception of the digital broadcast signal of channel 7-3.

As described above, even when, after a channel is directly selected, the user again wishes to view a channel which is viewed immediately before the selection, the user can view a program of a digital broadcast with requiring substantially no waiting time period.

In the above, the configuration in which the broadcast receiver 1 has the two tuner units has been described. The invention is not restricted to this configuration. The broadcast receiver 1 may have three or more tuner units. In the case where the broadcast receiver has three tuner units A, B, and C, when the user operates the channel up/down key 20a of the remote controller 20 to switch over a channel, for example, the tuner units are controlled so that the tuner unit A receives a broadcast signal of a channel which has been received and output, the tuner unit B receives a broadcast signal of a channel which is to be currently received and output, and the tuner unit C receives a broadcast signal of a channel which is scheduled to be next received and output. According to the configuration, when the user operates the channel up/down key 20a of the remote controller 20 to switch over a channel, the user can view the channel of the digital broadcast which is to be next received, with requiring substantially no waiting time period. Moreover, even when the channel which is received just before the operation is to be again viewed, the user can view the channel with requiring substantially no waiting time period.

The invention can attain the following effects and advantages.

The broadcast receiver can previously receive a digital broadcast. When the user selects a channel in ascending or descending order of channel number, therefore, a program of the digital broadcast can be promptly displayed on a monitor apparatus, so that the user can check the program with requiring substantially no waiting time period.

When an analog or digital broadcast signal of a frequency band corresponding to an analog broadcast of another channel or a channel of a digital broadcast of the same physical channel is to be received, video and audio signals can be output immediately or with requiring substantially no waiting time period. Therefore, the user can check a program on a display apparatus with requiring substantially no waiting time period.

When the user operates the channel up/down section to switch over a channel, the user can view a channel of the digital broadcast which is to be next received, with requiring substantially no waiting time period. Moreover, even when a channel which is received just before the operation is to be again viewed, the user can view the channel with requiring substantially no waiting time period.

What is claimed is:

1. A broadcast receiver comprising:
a plurality of receiving means each of which receives an analog broadcast signal and a digital broadcast signal;
a channel up/down means through which a channel is selected in ascending or descending order of channel number;
a reception controlling means which, when a digital broadcast signal or an analog broadcast signal of a physical channel selected by the channel up/down means is received by anyone of the receiving means, causes another one of the receiving means to receive a digital broadcast signal of a physical channel allocated to a next rank to be selected by a channel-up or channel-down operation with respect to a currently selected physical channel; and
a switching means which selects one of the receiving means to output a broadcast signal from the selected receiving means;
wherein the receiving means which receives a digital broadcast signal or an analog broadcast signal of the physical channel selected by the channel up/down means is controlled to, in a case where the switching means selects the receiving means to output the broadcast signal and an input of selecting a next channel is conducted through the channel up/down means, when the next channel is an analog broadcast or a digital broadcast of the same physical channel, continue to receive the next channel; and
when a digital broadcast signal or an analog broadcast signal of the physical channel selected by the channel up/down means is received by any one of the receiving means, the reception controlling means causes another one of the receiving means to receive a digital broadcast signal of a physical channel which is next in an order selected by a channel-up or channel-down operation, with respect to the currently selected physical channel.

2. A broadcast receiver comprising:
a plurality of receiving means each of which receives an analog broadcast signal and a digital broadcast signal;
a channel up/down means through which a channel is selected in ascending or descending order of channel number;
a reception controlling means which, when a digital broadcast signal or an analog broadcast signal of a physical channel selected by the channel up/down means is received by anyone of the receiving means, causes another one of the receiving means to receive a digital broadcast signal of a physical channel allocated to a next rank to be selected by a channel-up or channel-down operation with respect to a currently selected physical channel; and
a switching means which selects one of the receiving means to output a broadcast signal from the selected receiving means.

3. The broadcast receiver according to claim 2, wherein the receiving means which receives a digital broadcast signal or an analog broadcast signal of the physical channel selected by the channel up/down means is controlled to, in a case where the switching means selects the receiving means to output the broadcast signal and an input of selecting a next channel is conducted through the channel up/down means, when the next channel is an analog broadcast or a digital broadcast of the same physical channel, continue to receive the next channel.

4. The broadcast receiver according to claim 3, wherein, when a digital broadcast signal or an analog broadcast signal of the physical channel selected by the channel up/down means is received by any one of the receiving means, the reception controlling means causes another one of the receiving means to receive a digital broadcast signal of a physical channel which is next in an order selected by a channel-up or channel-down operation, with respect to the currently selected physical channel.

5. The broadcast receiver according to claim 2, wherein, when a digital broadcast signal or an analog broadcast signal of the physical channel selected by the channel up/down means is received by any one of the receiving means, the reception controlling means causes another one of the receiving means to receive a digital broadcast signal of a physical channel which is next in an order selected by a channel-up or channel-down operation, with respect to the currently selected physical channel.

* * * * *